United States Patent

[11] 3,581,916

[72] Inventor Ivan S. Brumagim
 109 E. Fifth Ave., Warren, Pa. 16365
[21] Appl. No. 808,899
[22] Filed Mar. 20, 1969
[45] Patented June 1, 1971

[54] UNLOADER FOR CYLINDRICAL CONTAINERS
 8 Claims, 3 Drawing Figs.
[52] U.S. Cl. ..................................................... 214/17
[51] Int. Cl. ................................................. B65g 65/46
[50] Field of Search ............................................ 214/17.82

[56] References Cited
UNITED STATES PATENTS
| | | | |
|---|---|---|---|
| 3,084,814 | 4/1963 | Schaefer ....................... | 214/17(.82) |
| 3,259,538 | 7/1966 | Schnyder ..................... | 214/17(.82)X |
| 3,298,543 | 1/1967 | Laidig .......................... | 214/17(.82) |
| 3,391,809 | 7/1968 | Weaver et al. ................ | 214/17(.82) |
| 3,434,605 | 3/1969 | Yung ............................ | 214/17(.82) |

Primary Examiner—Robert G. Sheridan
Attorney—Charles L. Lovercheck

ABSTRACT: This specification discloses a bottom unloader for a silo. The silo has a floor. A radially extending manway is disposed below the floor and a transfer pit is disposed below the floor and above the manway. A vertical shaft is disposed on the centerline of the silo and extends from the manway up above the floor. A half-cylinderlike trough is supported below the transfer pit in the manway and a first screw conveyor is disposed in the trough. The first screw conveyor has a connection on its outer end for connecting to a drive motor. The inner end of the first conveyor is connected to the vertical shaft by a set of bevel gears. A second conveyor screw is disposed above the floor and has its inner end connected to the vertical shaft by a second set of bevel gears. The outer end of the second screw is connected to a ring that is supported around the inner periphery of the silo. A hydraulic ram moves the ring and thereby swings the second screw around the vertical shaft while it is being rotated by the vertical shaft. A half-cylinder-shaped shroud is supported over the trailing half of the second screw. Thus, the second screw moves material from the bottom of the silo into the transfer pit. Blades on the vertical shaft in the transfer pit move the material from the transfer pit to the first conveyor where it is moved out through the manway.

Inventor
IVAN S. BRUMAGIM

Inventor
IVAN S. BRUMAGIM

By
Charles L. Lovercheck  Attorney

UNLOADER FOR CYLINDRICAL CONTAINERS

GENERAL DESCRIPTION

The specification discloses an improved machine for unloading a cylindrical container wherein the bottom layer of its content is removed prior to the removal of subsequently higher layers. This machine will hereinafter be called a Bottom Unloader. A revolving screw conveyor assembly, pivoted on the container centerline, is made to swing through the bottom layer of the content. This assembly consists of a conveying screw provided with a trough oriented 90° from normal to shroud the screw through the half periphery opposite to the direction of the horizontal rotation of the assembly, a metal ring, just inside the container shell, which supports the outer end of the screw assembly and moves it into the content in a manner that as the screw turns, the screw shaves off a thin layer of the exposed face of the content and moves it toward the center of the container; the assembly is attached to the centering mechanism on which the assembly pivots. A reciprocating hydraulic ram interlocks with notches in the metal ring to rotate the screw conveyor assembly at about one revolution per hour. The application of the rotating force at the outer periphery of the assembly insures adequate torque to move the cutting faces of the screw into a most heavily packed and fibrous content and eliminates the massive structure which would be required to transmit such torque, if the source of torque emanated from the centerline of the container.

A manway of sufficient dimensions to easily permit the entry of a man and to house a screw conveyor assembly is provided in the container foundation. This conveyor moves the content from near the center of the container to the outside and is driven by a source outside the container. The shaft of the screw is splined at its inner end and thus the screw can be removed by disassembling its outer bearing support. The trough is flanged along its sidewalls. These flanges slide through lugs which, except for radial movement, hold the trough in place with relation to the container floor. Bolts, accessible from the outside, hold the trough radially in place. Two sets of separately enclosed bevel gears are mounted on a common vertical shaft located on the centerline of the container. The lower gear enclosure is fixed to the floor of the manway thereby providing the pivot around which the rotating screw assembly turns. The lower set of gears is driven by the splined shaft of the conveyor assembly. This shaft, in turn, is driven by an outside power source at about 78 r.p.m. The lower set of gears drives the vertical shaft, which is common to the two gear trains. Between the two gear housings means are provided to connect the vertical shaft to a set of blades which rotate at 39 r.p.m. within a transfer pit. The vertical location of this pit is between the floor of the container and the top of the bottom screw assembly trough. The action of these blades moves the content dropped into the pit from any point along its periphery by the rotating screw assembly to the inlet to the conveyor in the manway.

The upper set of gears transmits the rotation from the vertical shaft to the screw within the revolving screw assembly. This screw also operates at 78 r.p.m.

At a point just forward of the rotating screw assembly, hinged blades or teeth are attached to the upper edge of the metal ring to scrape the content from the container wall.

All of the assemblies described above are progressively removable and replaceable through the manway or through panels provided in the container shell with the content in place.

By these means, several significant improvements, not available in the prior art, are provided.

A revolving screw conveyor assembly is pivoted on the centerline of the container and is forced through the bottom layer of its content. This assembly is novel in that it consists of a conventional screw turning at about 78 r.p.m. and a conventional trough but with the trough oriented at 90° from its normal position to provide a shroud along the trailing half periphery of the screw as it is forced into the content. This arrangement and the additional shroud provided by the container floor as the screw moves in close proximity thereto effectively prevents overturning of the content and promotes its positive forward movement.

Both screw assemblies, the upper revolving assembly and the lower fixed assembly, operate on a true radius of the container, therefore, the space occupied by the gear enclosure prevents the discharge of content from the upper conveyor into the lower conveyor, except at that point of rotation of the upper conveyor just over the lower conveyor.

This is overcome by the use of a transfer pit provided with rotating blades which move the content brought to the center along any radius of the container from that point to the inlet to the lower fixed screw assembly.

All of the parts, including the gear reducers located on the centerline of the container, the elements of the transfer pit, and the lower screw assembly are removable through the outlet channel without removing the content of the container or providing special equipment for the purpose.

Except for the screw shroud and the metal ring, all of the parts of the revolving screw assembly are removable through panels provided in the silo wall without removing the content of the container or providing special equipment for the purpose.

THE PRIOR ART

The prior art offers no machine which is effective in a wide range of materials. There is bottom unloading equipment, which works well in relatively dry granular material, such as shelled corn, wheat or oats, but which is not efficient in the handling of fibrous material such as ensilage, haylage or similar materials. There is other equipment, which works well in handling haylage and ensilage, but which does poorly in the handling of granular materials.

In the prior art there is no bottom unloader, whose parts are accessible when the container is full of product, thus failures of mechanical parts are impossible to repair, except after manually unloading the container or by the use of special crews and equipment.

Heretofore, the undercutting mechanism has been made to revolve through the content by force applied at the centerline of the container. By applying the necessary force at the outer periphery of the undercutting mechanism far greater torque application is possible, thereby increasing the range of products in which this machine is effective.

OBJECTS OF THE INVENTION

The object of this invention is to provide an improved bottom unloader which will handle a wider range of materials than heretofore and whose parts are easily accessible for replacement or repair with the container full of product.

Another object of this invention is to provide a screw conveyor assembly below the container floor located on a true radius of the container, in which assembly the screw, trough and associated parts can be removed by means easily accessible from the outside of the container with the container content in place.

Another object of this invention is to provide the assembly, described immediately above, with a conveyor trough, which after the screw has been removed, can also be removed by means easily accessible from the outside of the container with the container content in place.

Another object of this invention is to provide a covered opening in the foundation of the container to house the assembly described immediately above but designed of such dimensions to serve as a manway after the removal of the conveyor assembly for access to the mechanical equipment located at the bottom centerline of the container.

Another object of this invention is to provide an enclosed gear train to transmit the torque of the screw shaft of the assembly described immediately above, first, to the blades within the transfer pit, mentioned in the next following paragraph, and secondly, to the screw shaft of a second screw shaft assembly pivoted at the centerline of the container and made to swing through the content just above the silo floor, with the elements of this gear train dimensioned for easy removal and replacement through the above mentioned manway.

Another object of this invention is to provide a closed top transfer pit equipped with rotating blades to move the content from any point within said pit at which the content is deposited by the revolving conveyor assembly, to the inlet to the lower discharging conveyor, with the parts thereof so dimensioned that they can be easily removed or replaced through the manway.

Another object of this invention is to provide a positive pivot at the container centerline to which the revolving screw conveyor assembly can be removably attached with the elements thereof so dimensioned that they can be easily removed and replaced through the manway.

Another object of this invention is to provide means of rotating the revolving conveyor assembly at approximately one revolution per hour through the bottom layer of content by a force applied at a point of maximum distance from the pivot.

Another object of this invention is to provide a rigid outer support and torque-transmitting member removably attached to and moving with the revolving screw assembly, designed to engage the thrust of a reciprocating hydraulic piston and dimensioned so that the screw and other elements subject to wear and replacement can be removed and replaced with the content in place through panels provided in the silo shell.

Another object of this invention is to orient the necessary screw conveyor trough from its normal position shrouding the screw through its bottom 180° of periphery through an angle of 90° so that the screw is shrouded through the 180° of periphery opposite the assembly's direction of rotation and thus insuring positive movement of the content toward the center of the container.

Another object of this invention is to prevent the content from occupying the space made vacant by the removal of the screw from the revolving screw assembly by extending the upper shell of the trough, as oriented, horizontally forward.

Another object of this invention is to provide means of maximum thrust of the especially oriented screw conveyor into the content thus insuring positive cutting away of the content face in the widest range of materials.

DETAILED DESCRIPTION OF THE DRAWINGS

Figure 1:
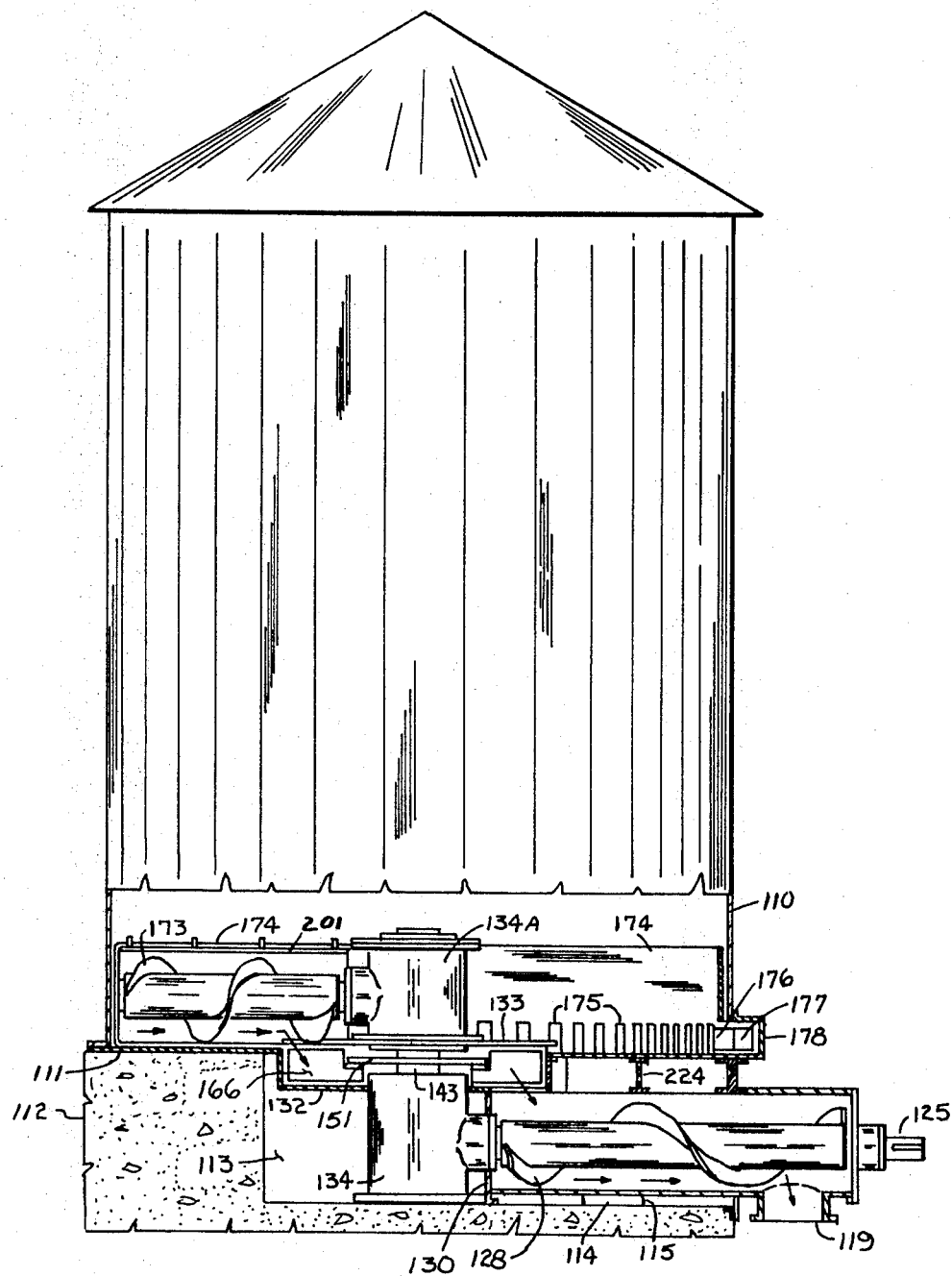
FIG. 1 is a view partly in cross section at the centerline of the silo and unloader according to the invention.
Figure 2:
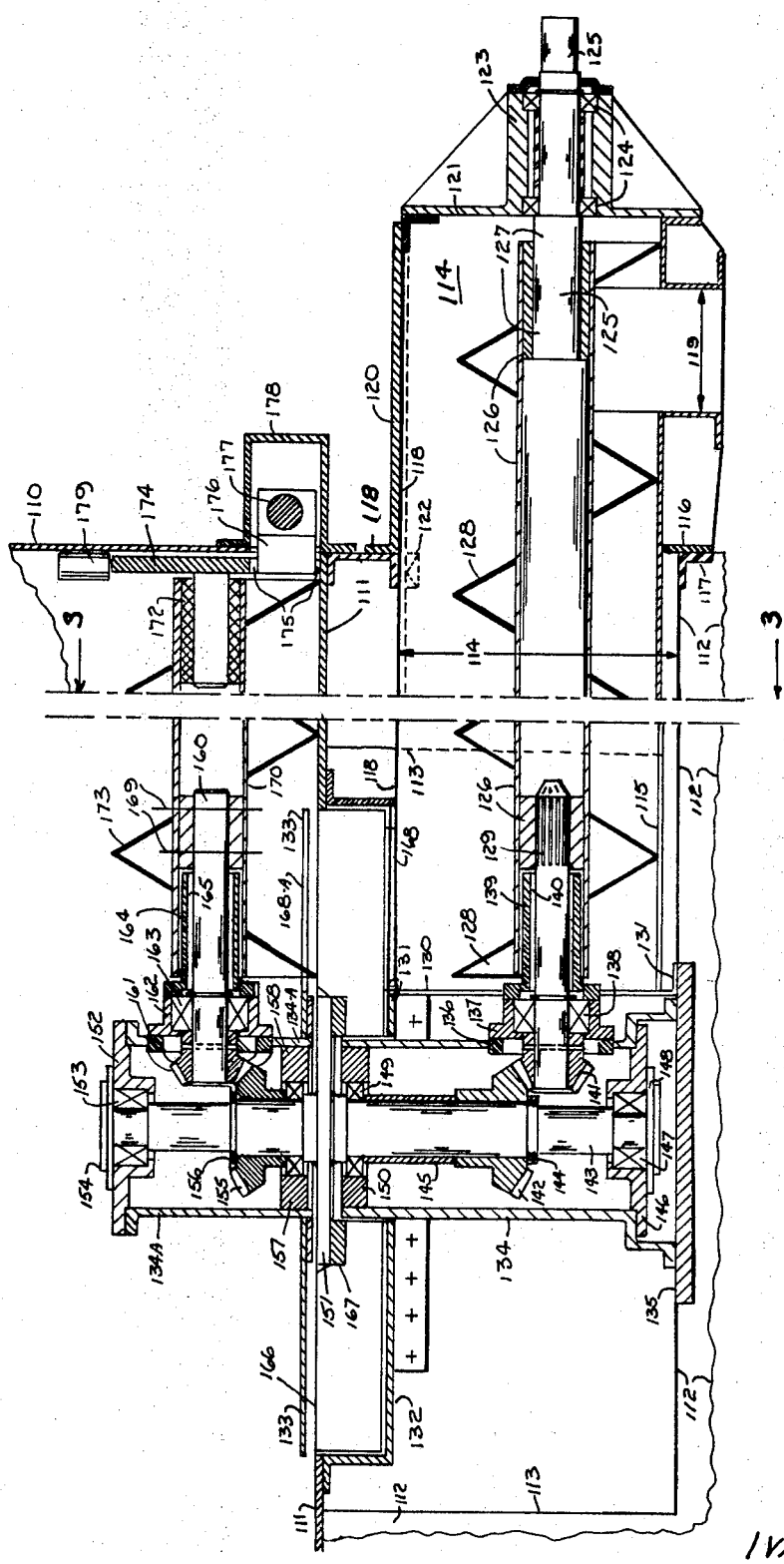
FIG. 2 is a cross-sectional view taken on line 2—2 of FIG. 3 to show the screw and the oriented trough combination of the upper revolving screw conveyor and the method of supporting the silo floor over the manway.

Referring now to the embodiment shown in FIGS. 1 and 2, a cylindrical silo or container shell 110 and silo floor 111 are fixed to a concrete foundation 112. Within foundation 112 is a central circular chamber 113 which connects with manway 114 giving access from the bottom center of silo to the outside. Removably located within manway 114 is screw shroud 115 to which is welded end plate 116, which fixes the shroud radially in place by means of capscrews 117. At the top of the side of trough or shroud 115 are outward flanges 118 which slide longitudinally through lugs 122 thus supporting and fixing trough 115 vertically and tangentially. Shroud 115 extends radially beyond the silo foundation 112 to accommodate the product outlet 119. The shroud 115 is closed by end plate 121 and cover plate 120 which are bolted in place. A bearing housing 123 is welded to end plate 121, within which radial thrust ball bearings 124 are placed to provide the radial and thrust support for screw 128 through shaft 125. Shaft 125 extends into hollow screw shaft 126 and is fixed thereto by pins 127. Screw 128 is welded to hollow shaft 126. Hollow shaft 126 is internally splined and engages with splined gear reducer pinion shaft 129, which provides radial support only for this end of screw 128. Thus by removing the bolts holding end plate 121 in place, the screw assembly consisting of parts 123 through 128 can be removed from shroud 115 and by removing the bolts holding end plate 116 in place, the shroud assembly consisting of 115 through 120 can be removed from manway 114. Shroud 115 is sealed at its inner end by removable plate 130 which is held in place by bolts 131. Circular transfer pit 132 is made up of four segments bolted in place and sized to be removable through manway 114. Transfer pit cover 133 is made in four segments bolted in place to gear housing 134A. These segments are removable through manway 114.

Gearboxes 134 and 134A are now accessible and removable through manway 114 and circular chamber 113.

Gearbox housing 134 is bolted to baseplate 135, embedded in concrete base 112. Pinion shaft 129 is assembled into gearbox housing 134 by means of flange 136, ball bearing housing 137 containing radial thrust bearing 138, sleeve bearing housing 139 bolted to housing 137 and sleeve bearing 140 contained within housing 139. Pinion 141 engages bevel gear 142 which is fixed on vertical shaft 143 by locknut 144 and sleeve 145. Vertical shaft 143 is assembled in the lower gear housing 134 by means of thrust plate 146, radial thrust bearing 147, bearing cap 148 in conjunction with radial bearing 149 which floats in top closing plate 150 and shoulders against center plate 151. Vertical shaft 143 thus rigidly fixed extends upward into and supports gearbox housing 134A and also is the pivot around which gearbox housing 134A and the upper conveyor assembly described later herein revolves.

Gearbox housing 134A is fixed to vertical shaft 143 by means of thrust plate 152, radial thrust bearing 153, bearing cap 154, bevel gear 155, locknut 156, radial bearing 157, which floats in bottom closing plate 158 and shoulders on centerplate 151.

Bevel gear 155 engages pinion 159 which is mounted on pinion shaft 160. Pinion shaft 160 is assembled into gearbox housing 134A by means of flange 161, ball bearing housing 162 containing radial thrust bearing 163, sleeve bearing housing 164 and sleeve bearing 165 contained within housing 164. Within transfer pit 132 are four rotating blades 166, which are fixed by individual bolting plates 167 to center plate 151 which is an integral part of rotating center shaft 143. As the content is pushed through opening 168A at any point around the periphery of transfer pit 132 by the action of revolving conveyor assembly described later, rotating blades 166 move said content to opening 168 in the bottom of transfer pit 132 where it drops in shroud 115.

Pinion shaft 160 is connected by through bolts 169 to hollow screw shaft 170 which is radially supported at its outer end by stub shaft 171 and bushing 172. Screw 173 is welded to hollow shaft 170.

Steel ring 174 circles the silo just inside silo shell 110. The lower section of ring 174 is cut to form a multiplicity of equally spaced teeth 175 extending around the full periphery between which the engaging member 176 of reciprocating ram 177 enters to force the ring 174 and the screw 173 around the bottom of the silo shaving the content into the action of screw 173 and thereby moving it radially through discharge 168A into transfer pit 132. A conventional housing 178 is provided to enclose the hydraulic ram 177. A section of ring 174 is bolted to the main ring section and is thus removable through the removable panels of silo shell 110.

A scraping mechanism 179 has a set of teeth 50 so arranged that the movement of the ring 174 through the content forces the teeth against shell 110 and scrapes the content from the shell 110.

Figure 3:
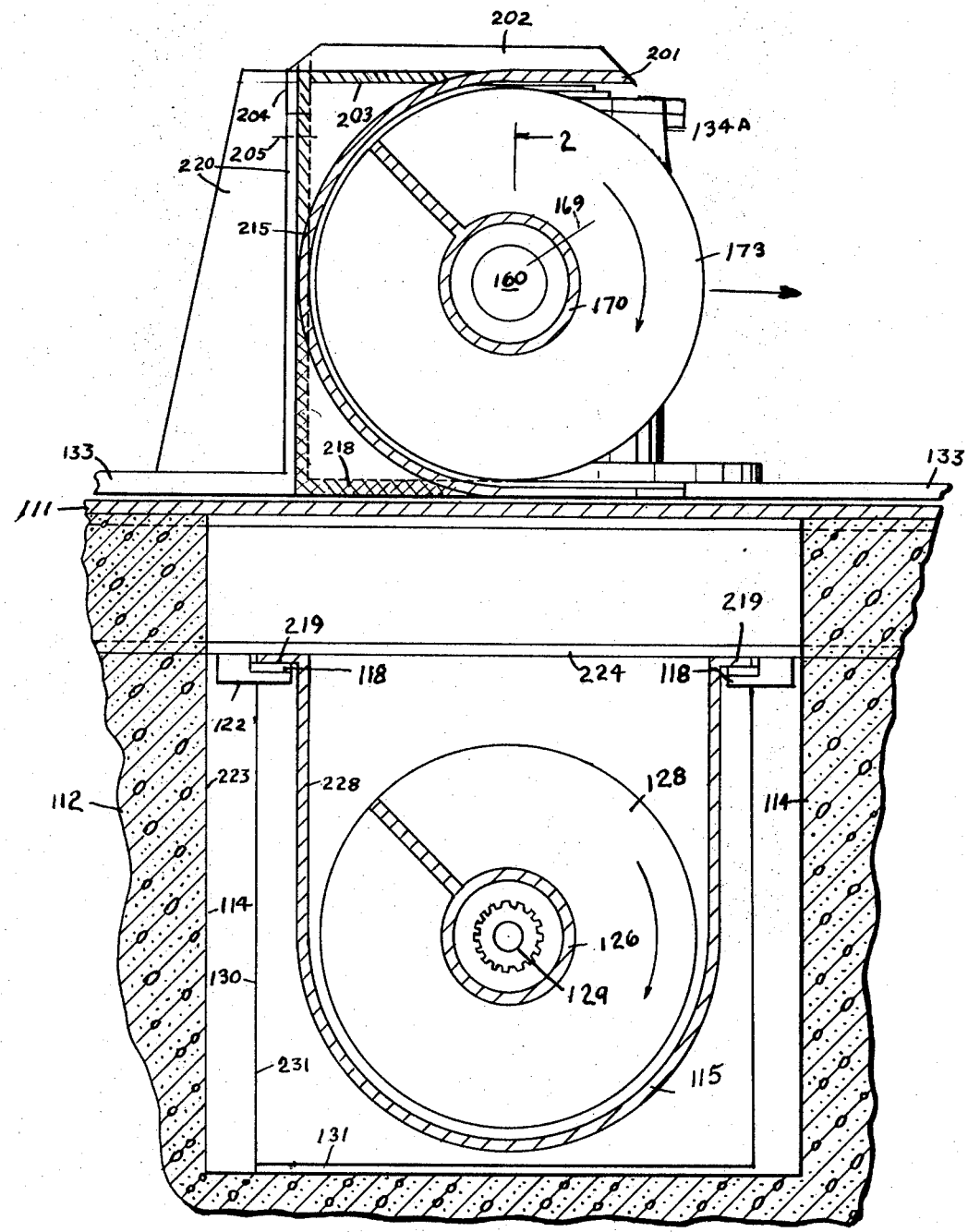
FIG. 3 is a cross-sectional view taken on line 3—3 of FIG. 2.

FIG. 3 is a cross section at 3—3 of FIG. 2, the purpose of which is to show the novel orientation of the shroud for upper screw 173 and the support means for silo floor 111 over manway 114. Parts 111 through 131 are elements of the manway and lower screw conveyor. Parts 160 through 173 are elements of the screw assembly shown in FIGS. 2 and 3. The transfer pit cover 133 is bolted to upper gear reducer housing 134A, which appears in FIG. 1. Connecting plate 204 is welded to cover 133 and extends from the inner end of screw 173 to the outer periphery of cover 133. A multiplicity of gussets 206 are welded to cover 133 and plate 204. Shroud 201 is formed to fit in close proximity to the following half periphery of screw 173 as said screw is swung into the product. At the point of tangent at the top of screw 173 shroud 201 extends forward to restrict the product from dropping into the screw area, especially when screw 173 has been removed from shroud 201. Screw 173 is located in close proximity to silo floor 111 in such manner that shroud 201 and the floor 111 combine to create an effective radial movement of the product as the screw 173 rotates and the conveyor assembly swings into the product.

Shroud 201 is reinforced by gussets 202. Plate 203 extends the full length of screw 173 and shroud 201 and at its inner end is bolted to connecting plate 204 by means of bolts indicated at 205. The outer end of plate 203 is similarly bolted to the removable segment of ring 174 (See FIG. 1).

A multiplicity of I-Beams 224 are fixed in the silo foundation to support silo floor 111 over manway 114.

By this novel use of progressively removable assemblies, the several objects of this invention are accomplished; namely, (1) to provide an efficiently shrouded screw assembly rotatable through the bottom layer of the silo content, (2) to provide rotating means applied at a point most remote from the pivot of the screw assembly and thus insure a maximum thrust of the screw into the content, (3) to provide by the combination of efficient shrouding and a most positive turning force of the screw assembly, efficient shaving away and radially inward movement of the lower layer of content in a wider range of material than heretofore possible, (4) to provide a transfer pit to receive the content moved toward the center by the rotating screw assembly at whatever radius of the silo said screw assembly may be passing, (5) to provide rotating blades within said transfer pit to move the content from any point within the pit to the inlet to a similar but fixed screw assembly which moves the content to the outside of the silo, (6) to provide complete accessibility to all working parts from outside the silo without the need to remove the content or to provide special equipment or labor for the purpose, and (7) to accomplish these things by the use of a simple combination of conventional and inexpensive mechanical elements.

The embodiments of the invention in which I claim an exclusive property or privilege are defined as follows:

1. A silo unloader comprising a lower screw conveyor and an upper screw conveyor,
   said screw conveyors being supported in vertically spaced relation to each other,
   a vertically extending shaft adapted to be supported substantially at the center of a silo,
   said screw conveyors having their inner ends rotatably connected to said vertical shaft,
   means to swing said upper conveyor around said vertical shaft whereby said upper conveyor moves over the floor of said silo,
   said means to swing said upper conveyor comprising a rotatable ring extending around the inside of said silo attached to said upper screw conveyor whereby said upper conveyor is adapted to move the content of said silo toward the center thereof, and said lower conveyor is adapted to move said content toward the sidewalls of said silo,
   said rotatable metal ring is notched along the bottom edge of its periphery thereby providing teeth,
   a reciprocating ram fixed to the periphery of said container,
   said reciprocating ram engaging said ring and engaging said teeth and forcing the screw assembly into and through said bottom horizontal layer of the container content, thereby providing the point of thrust at the extreme outer periphery of the rotating screw assembly.

2. The combination described in claim 1 in which scraping blades or teeth are attached to said metal ring just forward of the screw to scrape the content from the container wall as the assembly is forced through the content by said reciprocating ram.

3. In combination, a cylindrical container having a floor,
   upper screw means for moving material above said floor to an opening in said floor to a lower screw assembly,
   said lower screw assembly located below the floor of the container and extending radially of said container,
   a shroud comprising a half cylinder in close proximity to the lower half periphery of said lower screw to effect as the screw revolves positive movement of the content parallel to the screw shaft,
   and drive means fixed to said container and engaging said upper screw means for moving said upper screw around said container,
   said lower screw is positioned in a radially disposed manway provided in the container foundation to accommodate said screw assembly and to provide access from outside the container to the bottom center of the container,
   said half cylindrical shroud extends tangentially upward on both sides of said lower screw forming sidewalls making contact with I-beam means on said container floor,
   lugs fixed to said I-beams,
   said sidewalls flanged outwardly to engage lugs attached to said I-beams whereby said trough is fixed in vertical and horizontal directions and said trough may be moved radially into and out of its normal position within the manway.

4. The combination recited in claim 3 in which said trough is provided with a flange extending around said half cylinder,
   sidewalls and cover positioned along its length to make closure with downward extension of the container shell when the assembly is in its normal operating position whereby said assembly is airtight and easily removable from outside said container,
   an airtight end plate is fixed to and closes the outer trough end and said end plate is provided with a radial thrust bearing for said second screw,
   said thrust bearing being removable from the outside of the container,
   said radial thrust bearing centering said screw shaft at its outer end and taking its thrust in both directions with the inner end of said screw centered by a splined connection to the pinion shaft of a gear reducer located on the container centerline, thereby making the screw removable from the outside and providing means of driving said gear reducer from a power source outside said container.

5. The combination of claim 4 wherein said lower screw assembly is removably located in a radial opening of sufficient size in the container foundation that upon removal of said assembly said opening serves as a manway for assembly and replacement of the mechanism located in the bottom center of the container.

6. An unloader for a silo comprising
   a silo shell having a floor,
   a vertical shaft rotatably supported below said floor substantially on the vertical centerline of said silo,
   a radially extending manway below said silo floor,
   a lower screw in said manway,
   a transfer pit adjacent said vertical shaft below said floor,
   an opening in said floor connecting said transfer pit to said manway,
   and means in said manway to move said material from said manway to a product outlet opening,
   an upper screw connected to said vertical shaft, said screw being part of a conveyor assembly, adapted to swing about said shaft while the screw is rotating, to move material disposed in said container above said screw toward said transfer pit,
   said upper screw having a hollow shaft, a ring is disposed in said silo and is adapted to move along the inside bottom periphery of said silo, and a stub shaft is fixed to said ring to radially support the hollow shaft of said upper screw whereby the peripheral movement of said ring is transmitted to said upper screw assembly, a hydraulic ram is supported on the inside wall of said silo and adapted to rotate said ring, whereby said first screw conveyor is swung about said vertical shaft.

7. A cylindrical silo in combination with an unloading device comprising a silo, a floor in said silo, a manway under said floor, an upper screw conveyor pivotally connected at the center of said silo for moving material in said silo toward the center thereof, and means to swing said conveyor around the center of said silo with the outer end of said conveyor in close proximity to the inner periphery of said silo wall and adjacent said floor, an opening in said floor adjacent the center thereof communicating with said manway, and means to remove contents of said silo moved to said opening by said screw conveyor to said manway, a radially extending half cylindrical shroud is disposed in said manway, and a lower screw conveyor is disposed in said shroud for moving material to the outside of said manway, a ring is attached to said screw conveyor and extends around the inner periphery of said silo wall adjacent said floor, said ring having scraping teeth attached to its upper edge.

8. The silo recited in claim 7 wherein a shroud is supported over the bottom periphery of said lower screw conveyor in the form of a half cylinder, said shroud has laterally extending flanges disposed along its upper edges, and spaced lugs slidably receiving said flanges, whereby said shroud may be slid from said manway.